(12) United States Patent
Roy et al.

(10) Patent No.: US 10,352,784 B2
(45) Date of Patent: Jul. 16, 2019

(54) METHOD AND APPARATUS FOR MEASURING THRUST

(71) Applicant: University of Florida Research Foundation, Incorporated, Gainesville, FL (US)

(72) Inventors: Subrata Roy, Gainesville, FL (US); Jignesh Soni, Sarasota, FL (US)

(73) Assignee: UNIVERSITY OF FLORIDA RESEARCH FOUNDATION, INCORPORATED, Gainesville, FL (US)

(*) Notice: Subject to any disclaimer, the term of this patent is extended or adjusted under 35 U.S.C. 154(b) by 582 days.

(21) Appl. No.: 14/912,520

(22) PCT Filed: Aug. 26, 2014

(86) PCT No.: PCT/US2014/052749
§ 371 (c)(1),
(2) Date: Feb. 17, 2016

(87) PCT Pub. No.: WO2015/031388
PCT Pub. Date: Mar. 5, 2015

(65) Prior Publication Data
US 2016/0202131 A1 Jul. 14, 2016

Related U.S. Application Data

(60) Provisional application No. 61/870,132, filed on Aug. 26, 2013.

(51) Int. Cl.
*G01L 1/08* (2006.01)
*G01H 1/10* (2006.01)
(Continued)

(52) U.S. Cl.
CPC .............. *G01L 1/086* (2013.01); *G01H 1/10* (2013.01); *G01L 5/133* (2013.01); *G01L 25/00* (2013.01)

(58) Field of Classification Search
CPC .......... G01L 1/086; G01L 5/133; G01L 25/00; G01H 1/10
(Continued)

(56) References Cited

U.S. PATENT DOCUMENTS

2006/0075739 A1 4/2006 Wiseman
2006/0218891 A1 10/2006 Roy
(Continued)

FOREIGN PATENT DOCUMENTS

EP 0 346 458 B1 7/1991
WO WO 2011/103194 A2 8/2011

OTHER PUBLICATIONS

Cavendish, Henry. "Experiments to Determine the Density of the Earth," *Philosophical Transactions of the Royal Society of London*, 1798, 88:469-526.
(Continued)

*Primary Examiner* — Tarun Sinha
(74) *Attorney, Agent, or Firm* — Thomas | Horstemeyer, LLP

(57) ABSTRACT

Embodiments of the invention relate to a thrust stand and a method of measuring thrust. Embodiments of the invention pertain to a method of calibrating a thrust stand. Embodiments of the subject thrust stand can incorporate a passive eddy current based damper. Specific embodiments of the passive eddy current based damper can function without contact with the balance arm. Further specific embodiments of the passive eddy current based damper can be used in a vacuum. Embodiments can utilize signal analysis techniques to identify and reduce noise. A logarithmic decrement
(Continued)

method can be used to calibrate the thrust stand. Force measurements can be made with embodiments of the subject thrust stand for a standard macroscale dielectric barrier discharge (DBD) plasma actuator and/or other thrust producing devices.

37 Claims, 13 Drawing Sheets

(51) Int. Cl.
  G01L 25/00 (2006.01)
  G01L 5/13 (2006.01)
(58) Field of Classification Search
  USPC .......................................................... 73/650
  See application file for complete search history.

(56) References Cited

U.S. PATENT DOCUMENTS

2008/0028743 A1  2/2008 Wahl
2012/0304618 A1  12/2012 Roy

OTHER PUBLICATIONS

Clinton, John F. et al., "Potential Advantages of a Strong-motion Velocity Meter over a Strong-motion Accelerometer," *Seismological Research Letters*, May/Jun. 2002, 73(3):332-342.

Durscher, Ryan et al., "Aerogel and ferroelectric dielectric materials for plasma actuators," *Journal of Physics D: Applied Physics*, 2012, 45(012001):1-5.

Durscher, Ryan et al., "Evaluation of thrust measurement techniques for dielectric barrier discharge actuators," *Exp Fluids*, 2012, 53:1165-1176.

Durscher, Ryan et al., "On Multi-Barrier Plasma Actuators," 49th *AIAA Aerospace Sciences Meeting including the New Horizons Forum and Aerospace Exposition*, Jan. 4-7, 2011, Orlando, Florida, pp. 1-11.

Gamero-Castaño, Manuel et al., "A Torsional Balance that Resolves Sub-micro-Newton Forces," *Paper IEPC-01-235 at the 27th International Electric Propulsion Conference*, Oct. 15-19, 2001, Pasadena, California, pp. 1-10.

Gregory, James W. et al., "Force Production Mechanisms of a Dielectric-Barrier Discharge Plasma Actuator," *45th AIAA Aerospace Sciences Meeting and Exhibit*, Jan. 8-11, 2007, Reno, Nevada, pp. 1-13.

Jamison, Andrew J. et al., "Accurate Measurement of Nano-Newton Thrust for Micropropulsion System Characterization," 27th *International Electric Propulsion Conference, IEPC-01-236*, Oct. 15-19, 2001, Pasadena, California, pp. 1-14.

Kogelschatz, Ulrich. "Dielectric-barrier Discharges: Their History, Discharge Physics, and Industrial Applications," *Plasma Chemistry and Plasma Processing*, Mar. 2003, 23(1):1-46.

Kogelschatz, Ulrich. "Filamentary and Diffuse Barrier Discharges," *IEEE Transactions on Plasma Science*, Aug. 2002, 30(4):1400-1408.

Koizumi, H. et al., "Development of thrust stand for low impulse measurement from microthrusters," *Review of Scientific Instruments*, Oct. 2004, 75(10):3185-3190.

Mestiri, R. et al., "An experimental study of a plasma actuator in absence of free airflow: Ionic wind velocity profile," *Physics of Plasmas*, 2010, 17(083503):1-7.

Polzin, Kurt A. et al., "Thrust Stand for Electric Propulsion Performance Evaluation," *Review of Scientific Instruments*, 2006, 77(105108):1-11.

Roth, J. Reece et al., "Boundary Layer Flow Control With a One Atmosphere Uniform Glow Discharge Surface Plasma," 36th *Aerospace Sciences Meeting & Exhibit*, Jan. 12-15, 1998, Reno, Nevada, pp. 1-28.

Soni, Jignesh et al., "Design of a microNewton Thrust Stand for Low Pressure Characterization of DBD Actuators," 51st *AIAA Aerospace Sciences Meeting*, AIAA-2013-0755, Grapevine, TX, 2013, pp. 1-13.

Soni, Jignesh et al., "Low pressure characterization of dielectric barrier discharge actuators," *Applied Physics Letters*, 2013, 102(112908):1-5.

Thomas, Flint O. etal., "Optimization of Dielectric Barrier Discharge Plasma Actuators for Active Aerodynamic Flow Control," *AIAA Journal*, Sep. 2009, 47(9):2169-2178.

Wang, Chin-Cheng et al., "Three-dimensional effects of curved plasma actuators in quiescent air," *Journal of Applied Physics*, 2011, 109(083305):1-9.

Wang, Chin-Cheng et al., "Geometry Effects of Dielectric Barrier Discharge on a Flat Surface," 49th *AIAA Aerospace Sciences Meeting including the New Horizons Forum and Aerospace Exposition*, Jan. 4-7, 2011, Orlando, Florida, pp. 1-10.

Yang, Yuan-Xia et al., "A torsion balance for impulse and thrust measurements of micro-Newton thrusters," *Review of Scientific Instruments*, 2012, 83(015105):1-7.

Zhao, Pengfei et al., "Study of Spectrum Analysis and Signal Biasing for Dielectric Barrier Discharge Actuator," 50th *AIAA Aerospace Sciences Meeting*, AIAA-2012-0408, Nashville, Tennessee, 2012, pp. 1-9.

Ziemer, John K. "Performance Measurements Using a Sub-Micronewton Resolution Thrust Stand," 27th *International Electric Propulsion Conference*, Oct. 15-19, 2001, Pasadena, California, pp. 1-12.

Zito, Justin C. et al., "Investigation of Impedance Characteristics and Power Delivery for Dielectric Barrier Discharge Plasma Actuators," 48th *AIAA Aerospace Sciences Meeting Including the New Horizons Forum and Aerospace Exposition*, Jan. 4-7, 2010, Orlando, Florida, pp. 1-17.

Zito, Justin C. et al., "Microscale Dielectric Barrier Discharge Plasma Actuators: Performance Characterization and Numerical Comparison," 43rd *AIAA Plasmadynamics and Lasers Conference*, Jun. 25-28, 2012, New Orleans, Louisiana, pp. 1-14.

International Search Report dated Dec. 10, 2014, for International Application No. PCT/US2014/052749.

C. Coulomb, Histoire de l'Académie Royale des Sciences, 1785, pp. 569-577.

Yuan-Xia Yang, Liang-Cheng Tu, Shan-Qing Yang, and Jun Luo, "A torsion balance for impulse and thrust measurements of micro-Newton thrusters", Review of Scientific Instruments, 83, 015105, 2012.

www.kjmagnetics.com, retrieved Aug. 2018.

J. Zito, R. Durscher, J. Soni, S. Roy and D. Arnold, "Flow and force inducement using micron size dielectric barrier discharge actuators," Applied Physics Letters, vol. 100, 193502, 2012.

J. Muller, "Thruster Options for Microspacecraft: A Review and Evaluation of State-of-the-Art and Emerging Technologies," AIAA J., vol. 187, 2000.

M. Gamero-Castaño, "A torsional balance for the characterization of microNewton thrusters," Review of Scientific Instruments, vol. 74, No. 10, 2003.

METHOD AND APPARATUS FOR MEASURING THRUST

CROSS REFERENCE TO RELATED APPLICATIONS

This application is the U.S. National Stage Application of International Patent Application Number PCT/US2014/052749, filed Aug. 26, 2014, which claims the benefit of U.S. Provisional Patent Application Ser. No. 61/870,132, filed Aug. 26, 2013, the disclosures of which are hereby incorporated herein by reference in their entireties.

BACKGROUND OF THE INVENTION

The advent of nanosatellites has given rise to a new challenge in the field of space propulsion. These satellites, typically weighing between 1 and 10 kg, require very minute forces for executing maneuvers for station keeping, orbital corrections, and attitude control. These forces are often of the order of a few micronewtons or less. Although the design for thrusters capable of delivering these forces has been around for some time [1], the need exists for a simple, low cost measurement method that resolves these sub-micro-Newton forces accurately and reliably.

Thrust stands, which use the principle of a torsion balance, were conceived by Charles Coulomb to measure the electrostatic force leading to the discovery of the Coulomb Law [2], and later used by Henry Cavendish to measure the gravitational force between two masses [3]. A thrust stand is essentially a torsion spring, which undergoes angular deflections under the action of a torque. This angular deflection, generated by an unknown force acting at a known distance, can be measured as linear displacement of the balance arm at a known distance from the pivot.

Jamison et al [4], Zeimer [5], Gamero-Castaño et al [5], and Gamero-Castaño [7] and Yang et al [8], have all built thrust stands with the same fundamental working principle, albeit with different methods of calibration, damping techniques, and displacement measurement. Table I summarizes the details and the steady-state force resolution achieved by each of these.

pendulum stage suspended from 502 µm titanium fiber which acts as the torsion spring. No damping other than that provided by surrounding air was employed, and the thrust stand was calibrated by measuring the moment of inertia of the setup and oscillation frequency. The resolution for steady-state thrust is mentioned to be 0.09 µN. A mechanism for damping of torsion balance oscillations was demonstrated by Polzin et al [10]. However, Polzin's thrust stand had an ultimate resolution of 50 µN, As reported in Table I, several methods of calibration have been reported in literature. Many of these rely on a device that can produce an accurately known force against which the system is calibrated, with exceptions like the impact pendulum used by Ziemer [5] that relies on applying a known impulse instead of a steady-state force to back out the system dynamics. The orifice thruster, used by Jamison et al [4], is calibrated using Monte Carlo methods, which introduce a certain amount of uncertainty (±12.6%) in the exact force that the thruster delivers. The electrostatic force calibration implemented by Gamero-Castaño et al [6] and Gamero-Castaño [7] has its own disadvantages. The following error analysis shows that this electrostatic method inherently introduces multiple sources of error, necessitating a better calibration method.

The force between two identical parallel plate electrodes separated by a distance L and having area A is given by $$F = \frac{1}{2}\varepsilon\left(\frac{V}{L}\right)^2 A \tag{5}$$

Combining Eq. 4 and 5, the calibration constant $k_\theta$ can be written as, $$k_\theta = \frac{\varepsilon}{2} \cdot V^2 \cdot \frac{1}{L^2} \cdot A \cdot l^2 \cdot \frac{1}{x} \tag{6}$$

Applying error propagation analysis to this equation yields the following equation for relative uncertainty in $k_\theta$,

TABLE I

Review of thrust stands with sub-microNewton level resolution

| Team | Calibration Source | Damping Mechanism | Displacement Measurement | Resolution (µN) | Lowest Thrust Measured (µN) |
|---|---|---|---|---|---|
| Jamison et al [4] | Orifice Thruster | Viscous Oil Bath | LVDT | <1 | 0.088 (±2-16%) |
| Ziemer [5] | Impact Pendulum | Damping coil | LVDT | <1 | 1.0 (±20%) |
| Gamero-Castaño et al [6] | Electrostatic | Electrostatic | Fiber Optic LDS | 0.01 | 0.11 |
| Gamero-Castaño [7] | Electrostatic | Electrostatic | Fiber Optic LDS | 0.03 | 7.89 |
| Yang et al [8] | Free Oscillations | Air damping | Autocollimator | 0.09 | Not mentioned |

Note that the orifice thruster used by Jamison et al [4] was calibrated using DSMC techniques, and the lowest thrust measured was 88.8 nN. Actual steady state thrust measured by Ziemer [5] was 1 µN using a FEEP thruster. The lowest thrust measured by Gamero-Castaño et al [6] was 0.11 µN using an electrospray source, and 7.89 µN using a colloid thruster by Gamero-Castaño [7]. Yang et al [8] used a $$\frac{\partial k_\theta}{k_\theta} = \sqrt{\left(\frac{2dV}{V}\right)^2 + \left(\frac{2dL}{L}\right)^2 + \left(\frac{dA}{A}\right)^2 + \left(\frac{2dl}{l}\right)^2 + \left(\frac{dx}{x}\right)^2} \tag{7}$$

As can be seen, there are five sources of error in the above calibration method, some of which can be controlled more precisely than others. The applied voltage V, electrode area A, and the moment length l can be controlled to a fair degree of accuracy. However, the electrode gap L (typically 1 mm), and the sensor resolution dx (5 nm as per manufacturer specifications at www.philtec.com, LDS Model D100) present the biggest challenge in controlling the spread of the calibration data. Equation 7 suggests that a 10% error in L alone leads to a 20% error in $k_\theta$. Accounting for errors from the other sources would increase this figure further.

BRIEF SUMMARY OF THE INVENTION

Embodiments of the invention relate to a thrust stand and a method of measuring thrust. Specific embodiments have a resolution less than 100 nN, less than 90 nN, less than 80 nN, less than 70 nN, less than 60 nN, less than 50 nN, less than 40 nN, less than 30 nN, less than 20 nN, and/or less than 10 nN. Embodiments of the invention pertain to a method of calibrating a thrust stand. Embodiments of the subject thrust stand can incorporate a passive eddy current based damper. Specific embodiments of the passive eddy current based damper can function without contact with the balance arm. Further specific embodiments of the passive eddy current based damper can be used in a vacuum. Embodiments can utilize signal analysis techniques to identify and reduce noise. A logarithmic decrement method can be used to calibrate the thrust stand. Calibrated system noise floor results indicate a thrust measurement resolution in the range 10-20 nN can be achieved under laboratory conditions. Internal noise sources, e.g., electrical, can be less than 5 nm, which corresponds to approximately 10 nN. Force measurements can be made with embodiments of the subject thrust stand for a standard macroscale dielectric barrier discharge (DBD) plasma actuator and/or other thrust producing devices.

BRIEF DESCRIPTION OF THE DRAWINGS

FIG. 11A shows thrust and FIG. 11B shows relative effectiveness.

DETAILED DISCLOSURE OF THE INVENTION

Embodiments of the invention relate to a thrust stand and a method of measuring thrust. Specific embodiments have a resolution less than 100 nN, less than 90 nN, less than 80 nN, less than 70 nN, less than 60 nN, less than 50 nN, less than 40 nN, less than 30 nN, less than 20 nN, and/or less than 10 nN. Embodiments of the invention pertain to a method of calibrating a thrust stand. Embodiments of the subject thrust stand can incorporate a passive eddy current based damper. Specific embodiments of the passive eddy current based damper can function without contact with the balance arm. Further specific embodiments of the passive eddy current based damper can be used in a vacuum. Embodiments can utilize signal analysis techniques to identify and reduce noise. A logarithmic decrement method can be used to calibrate the thrust stand. Calibrated system noise floor results indicate a thrust measurement resolution in the range 10-20 nN can be achieved under laboratory conditions. Internal noise sources, e.g., electrical, can be less than 5 nm, which corresponds to approximately 10 nN. Force measurements can be made with embodiments of the subject thrust stand for a standard macroscale dielectric barrier discharge (DBD) plasma actuator and/or other thrust producing devices.

Embodiments related to a thrust stand that can resolve forces smaller than 1 micronewton, and preferably resolve forces of several nano-Newtons (~10 nN). In a specific embodiment, the lowest thrust measured using an embodiment of the subject thrust stand is 1.3 µN with an uncertainty of ±20%. Embodiments can use a torsion balance to measure thrust. Since the torsion balance is a proportional balance, a-priori calibration is preferred so that forces can be measured reliably and with a known certainty.

Figure 1:
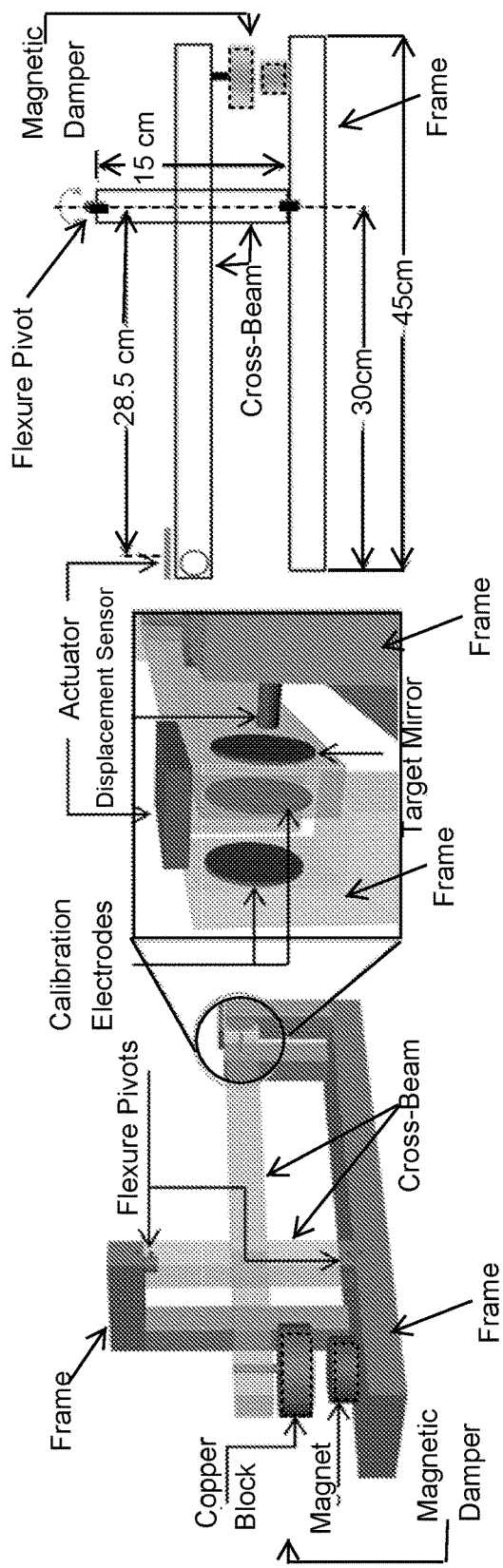
FIG. 1 shows a thrust stand in accordance with an embodiment of the subject invention.

FIG. 1 provides a schematic that shows a 3D representation of a specific embodiment of a thrust stand in accordance with the invention. The two flexure pivots at the vertical ends of the cross-beam form the torsion spring, which provides the restoring torque. Each flexure point can incorporate a cylindrical spring such that the spring is the only contact between the cross-beam and the frame. In this embodiment, the cross-beam is laterally unsymmetrical, which improves the sensitivity for a given length cross-beam. Other embodiments can have a symmetric cross-beam. Preferably the mass distribution on both arms reduces or eliminates any torque about a horizontal axis. Cross-beams that are unsymmetrical length-wise with respect to how long the arm on each side of the cross-beam extends from the axis of rotation can control the mass distribution of each arm to avoid, or reduce, a torque about a horizontal axis caused by the mass of the two arms. The embodiment of FIG. 1 allows the entire system to fit inside a vacuum chamber sized 10"×10"×22", with adequate clearance. The copper block, suspended at the short end of the cross-beam, acts as a counterweight and balances the unsymmetrical beam. Other materials besides copper can be used, such as aluminum, platinum, gold, and silver. Preferably, the material is a conductor with high electrical conductivity and non-magnetic. A pair of electrodes can be used to provide a known force or controlled displacement for calibration. The electrodes can have a variety of shapes such as disc, and a variety of materials such as aluminum. One electrode is on the frame and the other on the cross-beam such that a voltage creates an electrostatic force to displace the end of the cross-beam. An optical linear displacement sensor (such as a Philtec Model D-63) can be used to measure the displacement of the balance arm at a distance to calculate the angular deflection. Other mechanisms can be used to measure the linear displacement of the balance arm at a certain distance from the axis of rotation. The linear displacement then can be used to determine the angular deflection about the axis of rotation. Other mechanisms can be used to measure the angular deflection about the axis of rotation.

Embodiments of the subject thrust stand can function as a torsion pendulum. In specific embodiments, the thrust stand is undamped. The statics and dynamics of an undamped torsion balance can be characterized by two parameters: the torsion spring constant $k_\theta$, and the moment of inertia (MI) of the system $I_\theta$, which govern the natural frequency of the system as, $$\omega_n = \sqrt{\frac{k_\theta}{I_\theta}}. \tag{1}$$

As undamped embodiments can take a long period of time to reach equilibrium, further specific embodiments incorporate damping, to bring the system to a steady state more quickly, facilitating shorter times to obtain readings. Specific embodiments incorporating damping can be modeled by an equation of motion as follows:

$$\ddot{\theta} + 2\varsigma\omega_n\dot{\theta} + \omega_n^2\theta = \frac{f(t)l_T}{I_\theta} \tag{2}$$

where θ(t) is the instantaneous deflection angle about the axis of rotation, ζ is the damping coefficient, f(t) is the time dependent force, and $l_T$ is the distance from the pivot at which the force forms a torque (moment arm), i.e., the distance from the axis of rotation of which the force is applied.

For a constant force f(t)=F, Ziemer [5] gives the solution to Eq. 2 as, $$\theta(t) = \frac{Fl_T}{I_\theta\omega_n^2}\left[1 - \exp(-\varsigma\omega_n t)\times\left(\frac{\varsigma}{\sqrt{1-\varsigma^2}}\sin\left(\sqrt{1-\varsigma^2}\,\omega_n t\right) + \sin\left(\sqrt{1-\varsigma^2}\,\omega_n t\right)\right)\right] \tag{3}$$

the steady state solution to which can be written (using small angular displacement $$\theta = \frac{x}{l_s}\cdot\frac{180}{\pi}\right)$$

as $$\theta(t\to\infty) = \frac{F\cdot l_T}{k_\theta} \Rightarrow F = \frac{\theta(\infty)\cdot k_\theta}{l_T} \Rightarrow F = \frac{k_\theta}{l_T}\frac{x}{l_s}\frac{180}{\pi} \tag{4}$$

Hence, knowing the steady state linear displacement x, the spring constant $k_\theta$, the moment arm length $l_T$, and the sensor distance $l_s$, the unknown force F can be calculated, where the sensor distance is the distance away from the axis of rotation that the sensor measures the linear displacement of the cross-beam. For a given resolution of linear displacement x, the force resolution can be enhanced by increasing the moment length, increasing the sensor distance, and/or by lowering the spring constant of the torsion springs. In an embodiment for use in a vacuum chamber of a certain size, such as 10"×10"×22", the moment length and the sensor distance are constrained by the operating envelop of the stand. Further, there is a tradeoff between lower spring constants and the axial and radial load bearing capacity of the springs. In a specific embodiment, the springs are chosen to have a load bearing capacity of 98 lbs. Further embodiments can utilize springs with a lower bearing capacity, which allows a lower spring constant, and, therefore, better force resolution. The thrust stand can be used at atmospheric pressure, elevated pressures, and/or reduced pressures. The use of the thrust stand in reduced pressures allows measurements of actuators to be used in low pressures to be tested at the pressure they are to be used. Pressures of less than $10^{-4}$ torr, or less than $10^{-6}$ torr can be used, and pressures greater than 20 torr can be used, as examples.

In a specific embodiment, both the sensor and the calibration electrodes are located at a distance of 28.5 cm from the axis of rotation, or pivot axis, such that $l_s=l_T=1$. The torsion springs (Riverhawk Company) have a rated spring constant of 0.0016 N-m/deg each, with an accuracy of ±10%. In the configuration of FIG. 1, the two torsion springs act in parallel (due to identical displacements), hence the total spring constant is just a numerical sum of the two individual spring constants, giving a mean total spring constant for the system of around 0.0032 N-m/deg. In an embodiment where l and the spring constant are fixed, the resolution of the stand is controlled by the resolution with which the linear displacement x can be measured, and the accuracy with which the system can be calibrated.

Damping a dynamical system can reduce noise and reduce the time required to reach a stable deflection of the balance arm. In the absence of damping, the balance arm may vibrate for a significant duration (FIG. 2A), with the ambient environment, such as air, providing only minimal damping, apart from structural/thermal dissipation at the torsion springs. Preferably, the thrust stand uses an isolation chamber or other mechanism to prevent air currents from impacting the measurements. Embodiments can damp the system more rapidly by incorporating a damper. The damper can be incorporated in a variety of ways. A viscous fluid can be used with an extension from the cross-beam positioned in the fluid, such that motion of the cross-beam is damped. In a specific embodiment, a magnetic damper, based on eddy current damping, can be used. In an embodiment of the subject thrust stand, a damper can be used that has a cylindrical copper block (2½" dia.×1" height), having high conductivity, is mounted on the balance arm of the crossbeam, and a neodymium permanent magnet (½" dia.×1" height, $B_{surface}$=6619 Gauss [11]) is placed under the copper block, and in close proximity to the copper block (O(mm), see FIG. 2B). Other magnets can be used as well as other shaped blocks. As the cross-beam oscillates, the relative motion of the copper block and the magnet induces eddy currents in the copper block, which generates magnetic fields that are counter to the applied magnetic field from the magnet. The applied and induced, eddy current magnetic fields interact to produce a retarding force proportional to the relative motion, providing damping of the oscillation of the cross-beam. The amount of damping can be controlled by controlling the gap between the copper block and the permanent magnet. In a specific embodiment, the gap can be in the range of 0.5-3 mm. The blocks and the magnet should be flat enough to avoid contact. In a further specific embodiment, close-to-critical damping can be achieved, as shown in FIG. 2C, by selection of the gap, site of the copper block, and strength and size of the magnet, in relation to the mass distribution of the cross-beam and spring constant. Magnetic damping has inherent advantages of being a non-contact and vacuum compatible (as opposed to a viscous damper). The subject magnetic damper also does not require a power source and/or an active closed loop control (as opposed to an electrostatic/electromagnetic damper). This setup provides similar damping characteristics as a viscous damper using Lucas Heavy Duty Oil Stabilizer with a specific gravity of 0.895 and viscosity of $1.1 \times 10^{-4}$ m²/s.

An embodiment of the subject thrust stand was calibrated using three different approaches, and the uncertainty and error sources in these methods were analyzed. The first method involved observing the natural frequency of the undamped system to calculate the spring constant using Eq. 1, which is reformulated as $$k_\theta = \omega_n^2 \cdot I_\theta \quad (8)$$

The moment of inertia (MI) $I_\theta$ of the system is computed by superposition of the MIs of the component shapes and parallel axis theorem. This gives an estimate of $I_\theta$=0.0385 kg-m². The natural frequency for the undamped system is observed to be 2.240 rad/s from the time-series of FIG. 2A. These values, in conjunction with Eq. (8), give an estimate for $k_\theta$ of around 0.0034 N-m/deg, close to the stipulated value of 0.0032 (two springs in parallel, each with $k_\theta$=0.0016 N-m/deg) and within the 10% error margin quoted by the manufacturer. Note that this value of $k_\theta$ is only an approximation of the actual value to a certain error, since the system is not really undamped, as the air around the system provides a small but finite amount of damping. Therefore, a more accurate log-decrement method is used next to determine exactly how much damping the air provides, and to compute a more precise estimate of $k_\theta$. Although two springs of equal spring constant are used in the embodiment of FIG. 1, springs with different spring constants can be used. For example, a spring with a low spring constant can be used at the top such that the spring prevents contact between the frame and the crossbeam, and a large spring constant spring can be used at the bottom. Springs can have a spring constant less than 0.0016, less than 0.0014, less than 0.0002, or in the range of 0.0002 to 0.0014 N-m/deg.

The log decrement method, which is described in J. Soni and S. Roy, "Low Pressure Characterization of DBD Actuators," Applied Physics Letters, vol. 102, 112908, 2013, which is incorporated herein by reference in its entirety, backs out the damping ratio of the system based on successive peaks of damped oscillations, which, in conjunction with the observed damped frequency, provides an estimate of the spring constant, $k_\theta$. For n cycles of a damped oscillation, the logarithmic decrement $\delta$ is defined as $$\delta = \frac{1}{n} \ln \frac{x_0}{x_n} \quad (9)$$

where $x_0$ and $x_n$ are the amplitudes of the first and $n^{th}$ peaks, respectively. The damping ratio $\varsigma$ is then found using the relation $$\varsigma = \frac{1}{\sqrt{1 + \left(\frac{2\pi}{\delta}\right)^2}} \quad (10)$$

From the observed damped frequency $\omega_d$ and the damping ratio, the natural frequency $\omega_n$ can be estimated as $$\omega_n = \frac{\omega_d}{\sqrt{1 - \varsigma^2}} \quad (11)$$

Finally, the spring constant then can be estimated from Eq. 8.

Figure 2A:
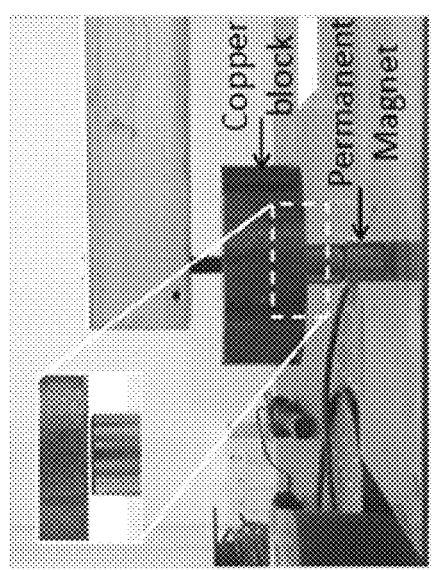
FIGS. 2A-2C show undamped oscillations (FIG. 2A), a magnetic damper in accordance with an embodiment of the subject invention (FIG. 2B), and damped oscillations with increasing damping from left to right (FIG. 2C).
Figure 2B:
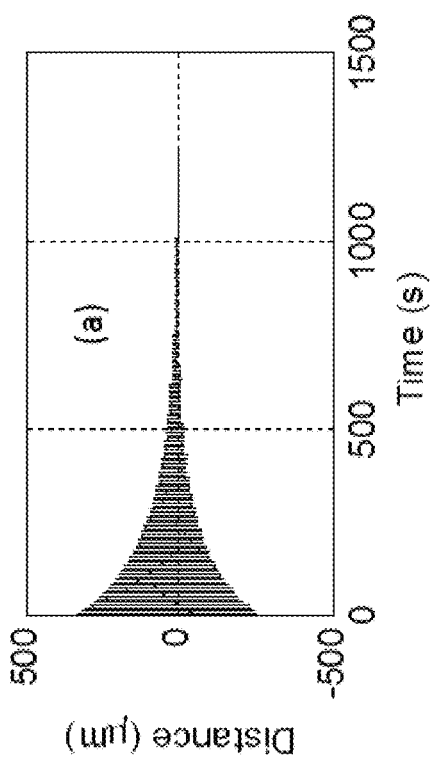
Figure 2C:
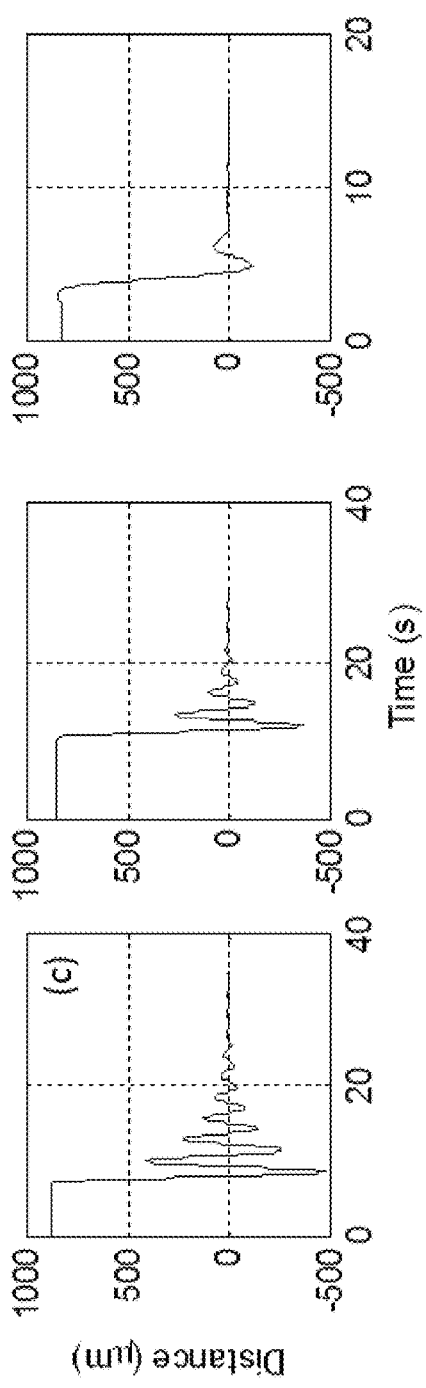

Applying this method to the data extracted from FIG. 2A, we get an average value of $k_\theta$=0.003379 N-m/deg based on several values of n, demonstrating that neglecting air damping results in a nominal error of approximately 0.7%. The damping ratio in this case is found to be around 0.0028, justifying the undamped assumption.

The same analysis is applied to the embodiment of the system when it is damped using the magnetic damper. A comprehensive set of calibration readings are taken at varying displacements, in order to confirm linearity of the spring constant over the desired range of displacement. Increasing displacements are produced by increasing the electrostatic force exerted by the parallel electrodes using higher voltage differentials, and the system is set to oscillate by turning off the voltage drop, and hence turning off the force. As evident in FIG. 3, calibration values from both the electrostatic force and log decrement method are seen to converge around a value of 0.00345 N-m/deg, with a standard deviation of ~0.07%. The spread in the data at lower displacements has to do with the fact the LDS signal-to-noise ratio decreases at lower displacement, leading to higher uncertainty in the results. Moreover, a slightly higher value than the nominal 0.0032 N-m/deg is to be expected, since the axial and radial loadings that the springs are under alter the spring constant slightly.

The log-decrement method offers the advantage that it is free from errors in the source used to generate the displacement, and depends only on the response of the system itself. The ratio of successive peaks of the cross-beam motion can be used to determine the applied force, or thrust, of the actuator, or other force producing device. This greatly reduces the uncertainties associated with calibration process, with the only sources of error being the lower limit on the sensor resolution (which determines the uncertainty in $\omega_n$), and the accuracy with which the MI of the system can be calculated. The uncertainty propagation relation for Eq. 8 is then $$\frac{\partial k_\theta}{k_\theta} = \sqrt{\left(\frac{2d\omega_n}{\omega_n}\right)^2 + \left(\frac{dI_\theta}{I_\theta}\right)^2} \quad (12)$$

Figure 3:
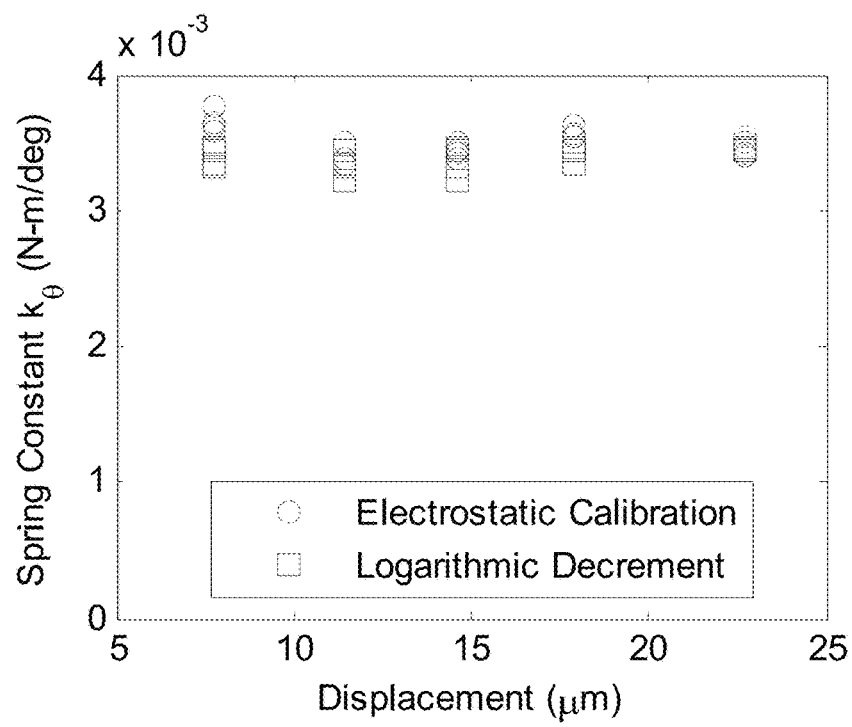
FIG. 3 shows a comparison between calibration using an electrostatic force method and calibration using a log decrement method.
Figure 4:
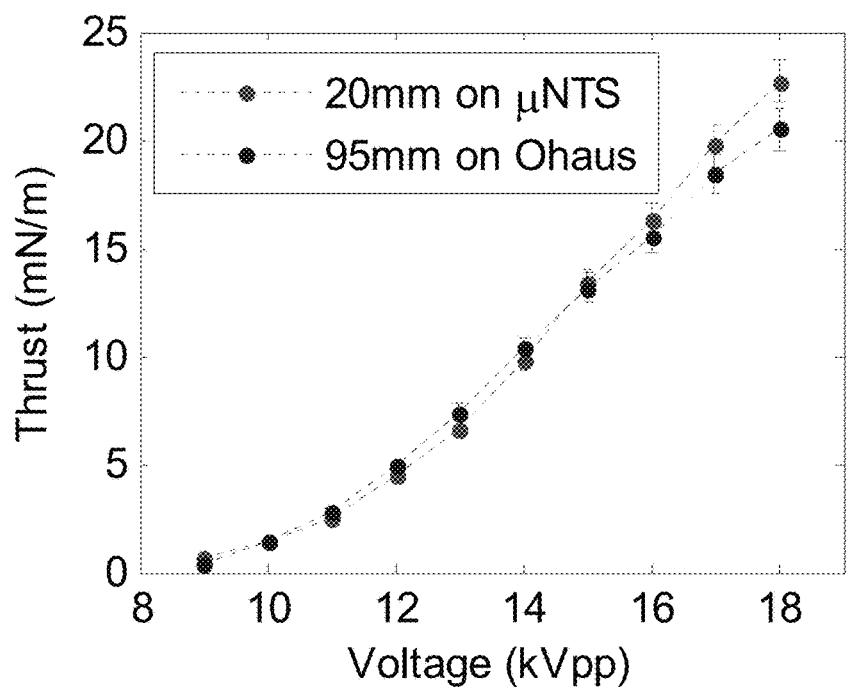
FIG. 4 shows a comparison of a force measurement using a commercial precision balance and a force measurement using an embodiment of a thrust stand in accordance with an embodiment of the subject invention.

The MI $I_\theta$ can be measured to a high degree of certainty using a precision weighing scale and Vernier calipers. A simple uncertainty analysis suggests a good conservative estimate for $dI_\theta$ would be 5%. The relative uncertainty estimate for $\omega_n$ is not so straightforward since it depends on the way the errors in $x_0$ and $x_n$ propagate thru Eq. 9, 10, and 11. The mathematical form of these equations results in an estimate that depends on the actual values of $\delta$, $\zeta$, and $\omega_n$. Reasonable estimations based on typical values ($\delta \sim 0.8$, $\zeta \sim 0.14$) suggest a 10% spread in $\omega_n$, which translates into a 20.6% error for $k_\theta$. FIG. 3 suggests that the statistical scatter in $k_\theta$ is also of the same order (20%).

Figure 5:
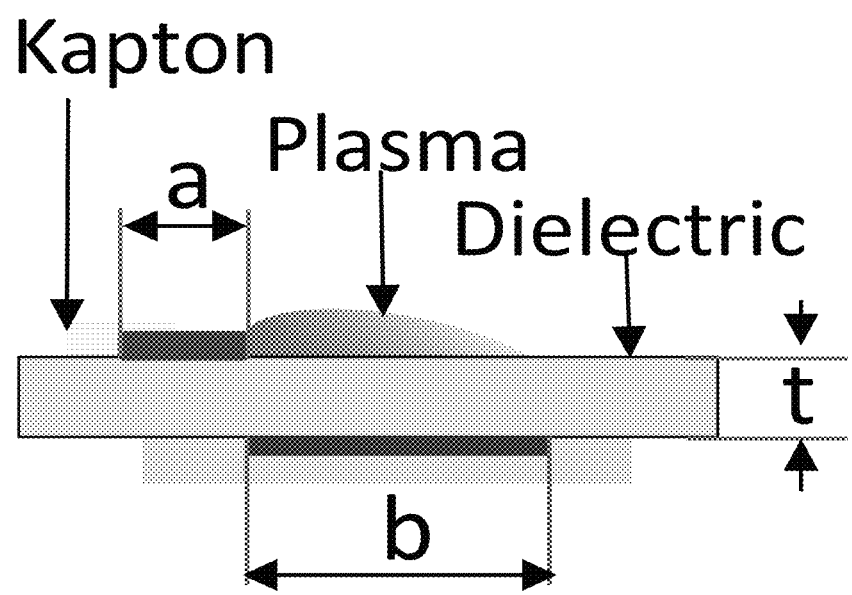
FIG. 5 is a schematic of a plasma actuator, showing actuator details for macro and micro plasma actuators.

To check how a specific embodiment of the subject thrust stand compares with a commercial balance, a dielectric barrier discharge (DBD) plasma actuator was designed and tested on both the embodiment of the subject thrust stand, and a commercial precision balance (Ohaus Adventurer Pro™ AC313C, 1 mg resolution). The plasma actuator includes a 1.5 mm thick acrylic with 5 mm wide powered electrode and a 20 mm wide ground. The upstream edge of the powered electrode was covered to prevent reverse discharge, and the ground electrode was covered with several layers of electrical tape. The actuator mounted on the commercial precision balance was 95 mm long (to produce enough force to assure a high signal-to-noise ratio), whereas the actuator mounted on the embodiment of the subject thrust stand was 20 mm in length due to space and displacement constraints on the thrust stand. FIG. 5 suggests that the force per length results for the two actuators, as measured using the commercial balance and the embodiment of the subject thrust stand, seem to agree well. We see that direct force measurement from the embodiment of the subject thrust stand start diverging at higher voltage (above 15 kVpp). This might have to do the different downstream plate lengths of the two actuators, the downstream plate length being shorter in the case of the 20 mm actuator. Durcher and Roy [13] have demonstrated that indeed a shorter downstream plate length leads to a higher force (by up to 20%) due to decreased drag loss along the plate surface. Although minor dimensional differences resulting from hand-fabrication of the actuators, and surface charge retention or surface contamination could also be responsible for the observed deviation. Table II in conjunction with FIG. 5 provides the details of the actuator geometries and operating parameters tested on the embodiment of the subject thrust stand (a=powered electrode width, b=ground electrode width, t=dielectric thickness, L=actuator length, V=applied voltage, f=applied frequency).

TABLE II

Details of the actuator geometries and operating parameters

| Setup | Dielectric | a mm | b mm | t mm | L mm | V kVpp | f Hz |
|---|---|---|---|---|---|---|---|
| Macro | Acrylic | 5 | 20 | 1.5 | 20, 95 | 9-18 | 14 |
| Micro | Polyamide | 0.01-0.5 | 0.01-1.0 | 0.01 | 1.0 | 3-6.5 | 1 |

Very small force resolutions of embodiments of the subject thrust stand render the thrust stands susceptible to a myriad of external and internal noise sources. The external sources include, for example, any external mechanical disturbance transmitted to the force balance by seismic or pressure disturbances. Clinton and Heaton [14] suggest the earth's surface has a seismic background noise in the 0.01-10 Hz range, rendering any sensitive pendulum susceptible to seismic noise in this spectral range. To alleviate these disturbances, embodiments of the subject thrust stand can be housed inside a transparent isolation chamber to prevent from air drafts, and/or stationed on top of a heavy optical bench, or other appropriate base, to reduce or eliminate seismic disturbances. Internal sources include, for example, electrical noise in the LDS optical amplifier and electronics. In an embodiment, the electrical noise of the LDS is the limiting noise for the force resolution and can be less than 10 nm, less than 5 nm, less than 2 nm, and/or less than 1 nm, which corresponds to a force based on the dimensions and parameters of the thrust stand.

Figures 6A, 6B:
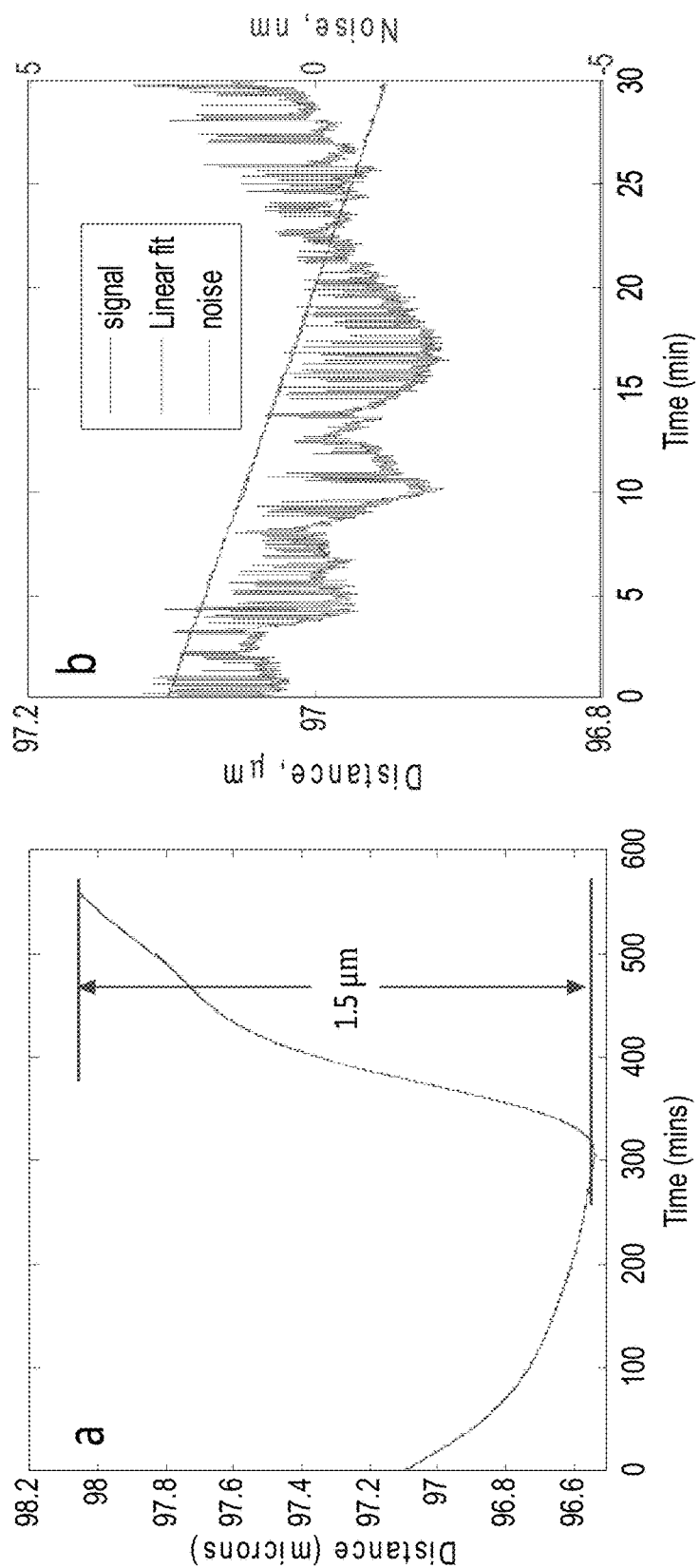
FIGS. 6A-6B show sensor drift over a period of 8 hrs (FIG. 6A) and a 30-minute snapshot of the drift/noise profile (FIG. 6B).

To characterize the internal noise of the thrust stand, the signal from the linear displacement sensor was pointed to a stationary target (a polished aluminum surface) and was monitored over several different durations to identify and characterize any noise patterns. The arrangement was optically shielded from stray light to limit the noise to purely internal electrical sources. FIGS. 6A-6B show the sensor output over several different time scales. The plot of displacement over 8 hours (FIG. 6A) shows that the sensor reading drifts by up to 1.5 µm over this duration, which corresponds to a force of about 3.6 µN. Subtracting a linear fit of the drift from the signal over a 30-minute period (FIG. 6B), the electrical noise of the displacement sensor is seen to be of the order of 5 nm, which corresponds to a force of about 0.012 µN.

The drift was found to be extremely linear over short timescales (FIG. 6B), with $R^2$ values of the linear fits approaching 0.99. This simplifies the task of drift correction since a typical force measurement lasts only a few minutes. Thermal expansion of the aluminum target resulting from ambient temperature fluctuations was identified as one possible cause. Calculations considering the size and coefficient of thermal expansion of the target, over the measured range of temperature fluctuations, further support this hypothesis.

Figure 7A:
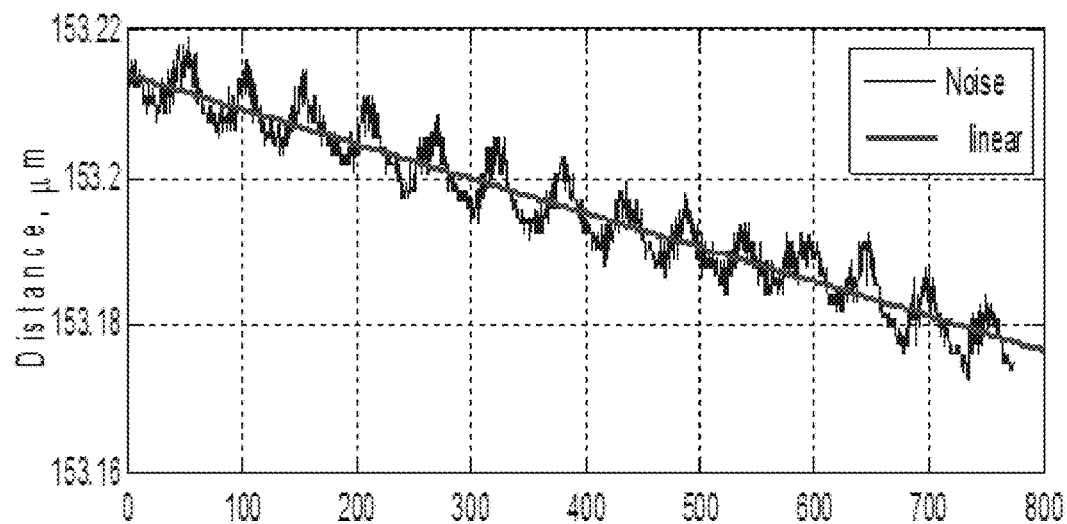
FIGS. 7A-7B show linear drift and periodic noise for a signal from a sensor in accordance with an embodiment of the subject invention (FIG. 7A) and the residual of the original signal around a linear fit, which shows a periodic component (FIG. 7B).
Figure 7B:
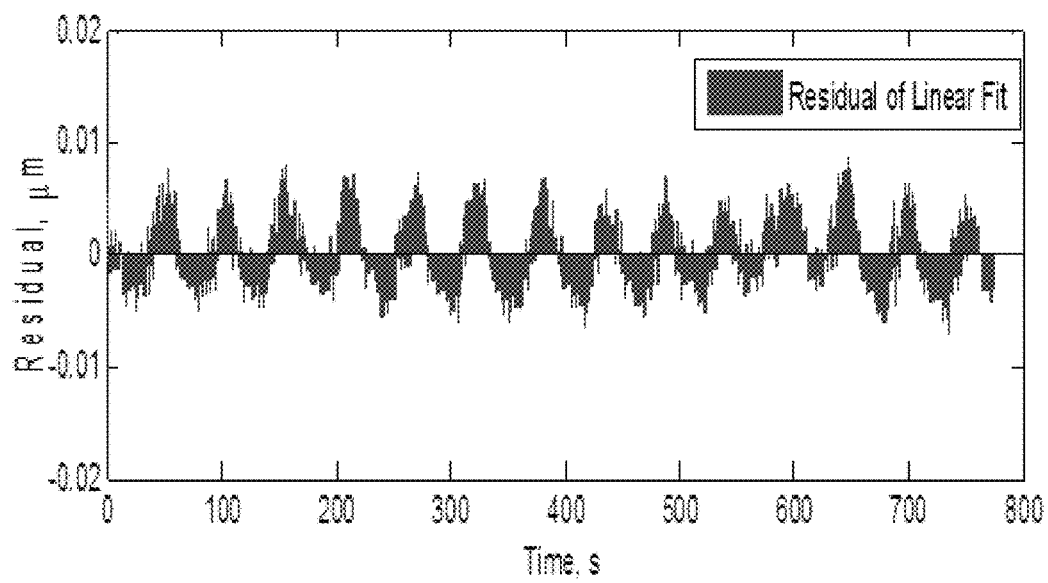

To characterize the external noise, the linear displacement sensor was integrated with the thrust stand, and readings taken without any force producing device mounted on the stand. FIG. 7A shows a 12 minute plot of the sensor. The trend suggests a periodic noise superimposed on the linear drift. Residual of the original signal around a linear fit (FIG. 7B) reveals a highly sinusoidal noise profile.

Figure 8A:
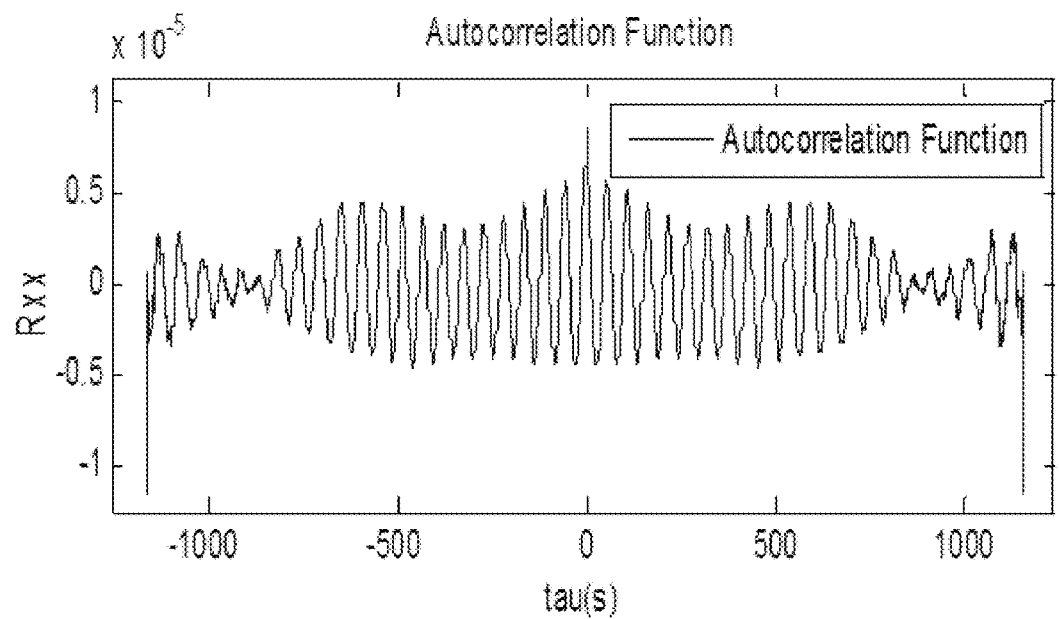
FIGS. 8A-8B show the results of autocorrelation of the sensor noise profile (FIG. 8A) and a fast Fourier transform (FFT) of the autocorrelation function (FIG. 8B).
Figure 8B:
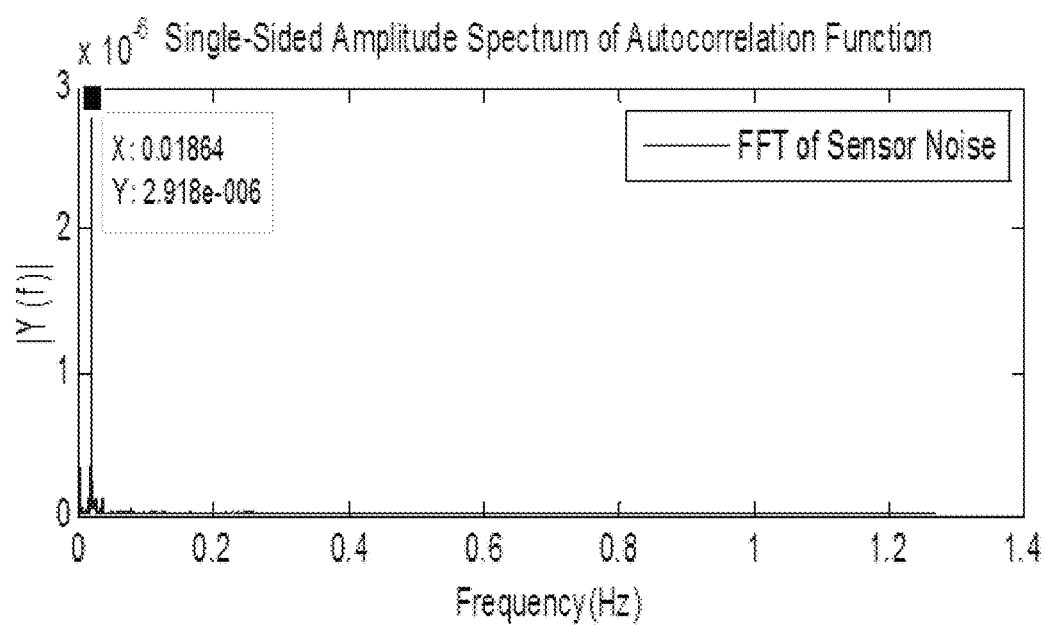

Autocorrelation analysis of the original signal (FIG. 8A) produces a weak delta function coupled with superimposed sinusoidal noise, which is in agreement with the observed noise profile. Fast Fourier Transform of the autocorrelation function (FIG. 8B) suggests a major peak at 0.01864 Hz, and two minor peaks at 0.01678 Hz, and 0.001243 Hz.

Figure 9A:
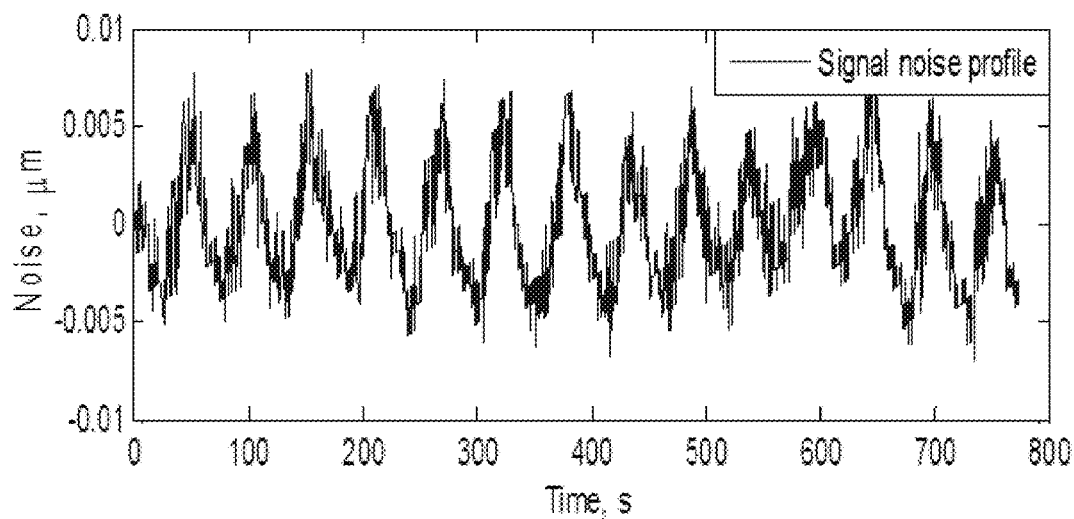
FIGS. 9A-9B show the drift-subtracted sensor noise from FIG. 7A (FIG. 9A) and the single-sided frequency-amplitude spectrum of this noise profile using fast Fourier transform (FIG. 9B).
Figure 9B:
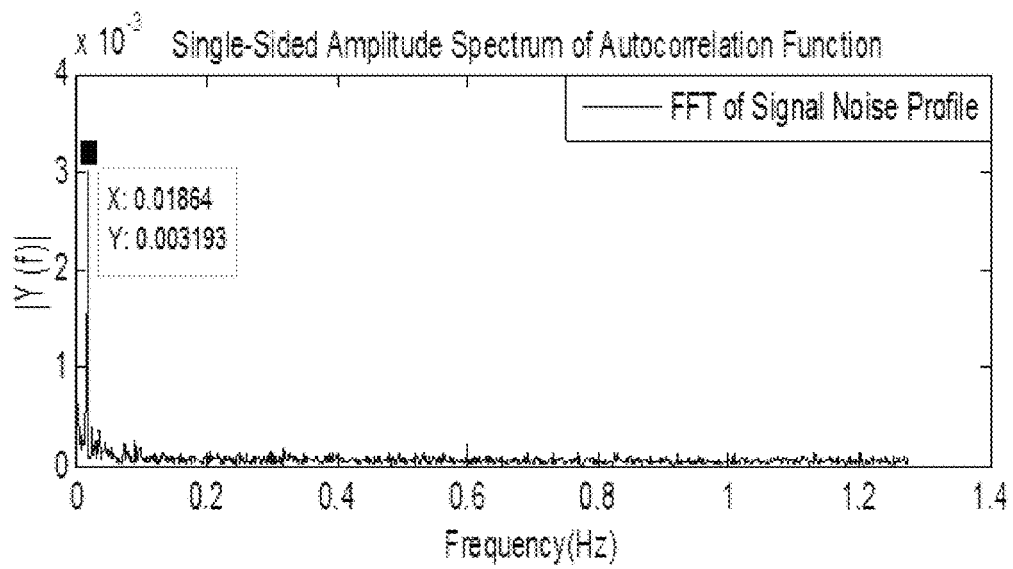

FIGS. 9A-9B show the drift-subtracted noise from FIG. 7A (FIG. 9A), and the single-sided frequency-amplitude spectrum of this noise profile obtained using FFT (FIG. 9B). This plot confirms the frequency peak at 0.01864 Hz, along with some minor peaks in the same vicinity as the FFT of the autocorrelation function.

This frequency is several orders of magnitude lower than the 60 Hz mains noise, which is a possible source of the noise. This is due to the fact that the sampling frequency for this time series (2.5 Hz) is 24 times less than the signal frequency, which leads to folding/aliasing. Using the concept of Nyquist frequency and knowing the apparent frequency from the FFT, the frequency folding diagram is used to identify the actual frequency [15]. Results suggest 60.3

Hz as one of the possible source frequencies, which is within 0.03% of the mains frequency. The noise may also be due to stray light from fluorescent lighting, which is known to flicker at line frequency (60 Hz) or its second harmonic (120 Hz). Embodiments of the subject thrust stand can use a noise-corrected version of the linear displacement sensor, which can alleviate this problem.

Figures 10A, 10C:
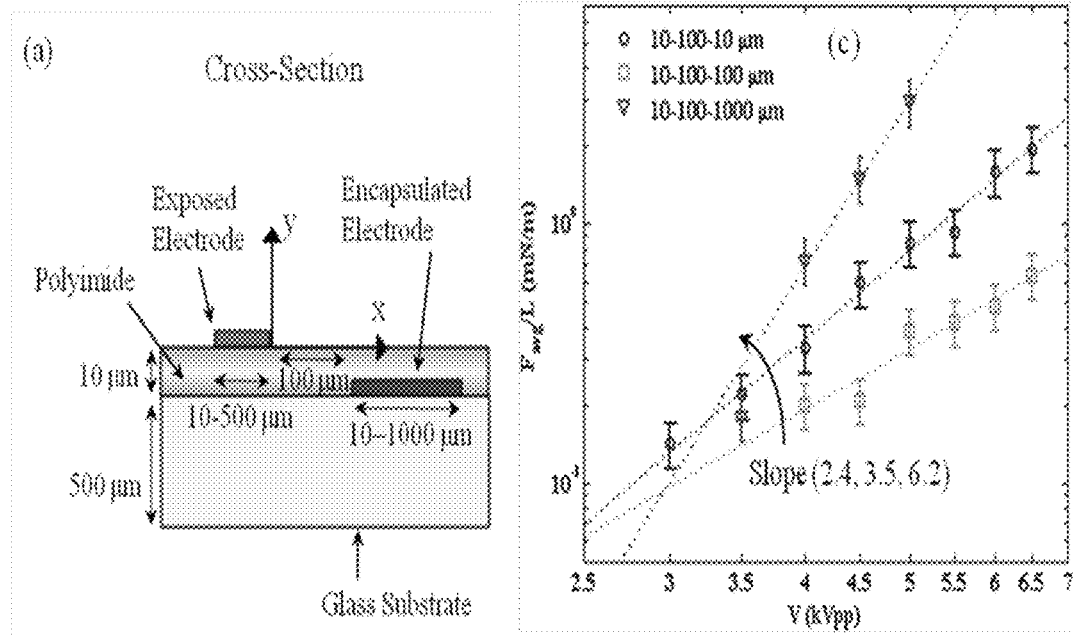
FIGS. 10A-10C show a schematic of a microactuator (FIG. 10A), a powered microactuator (FIG. 10B), and force data from an embodiment of a thrust stand in accordance with an embodiment of the subject invention (FIG. 10C).
Figure 10B:
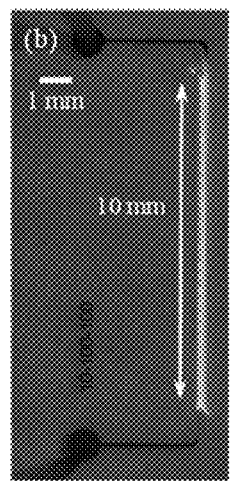

An embodiment of the subject thrust stand has been used for measurement and characterization of force from DBD actuators of varying sizes, configurations, and at varying operating conditions. Zito et al [16] have used an embodiment of the subject thrust stand for measuring force from micron scale DBD actuators (FIGS. 10A-10C). The actuators were made using photolithography techniques and have characteristic dimensions (dielectric thickness, electrode widths and separation) of the order of microns. Scaling laws based on performance trends of macroactuators suggested such actuators should produce forces of the order of micronewtons. An embodiment of the subject thrust stand was able to successfully resolve these forces as evident in FIGS. 10A-10C.

Figure 12A:
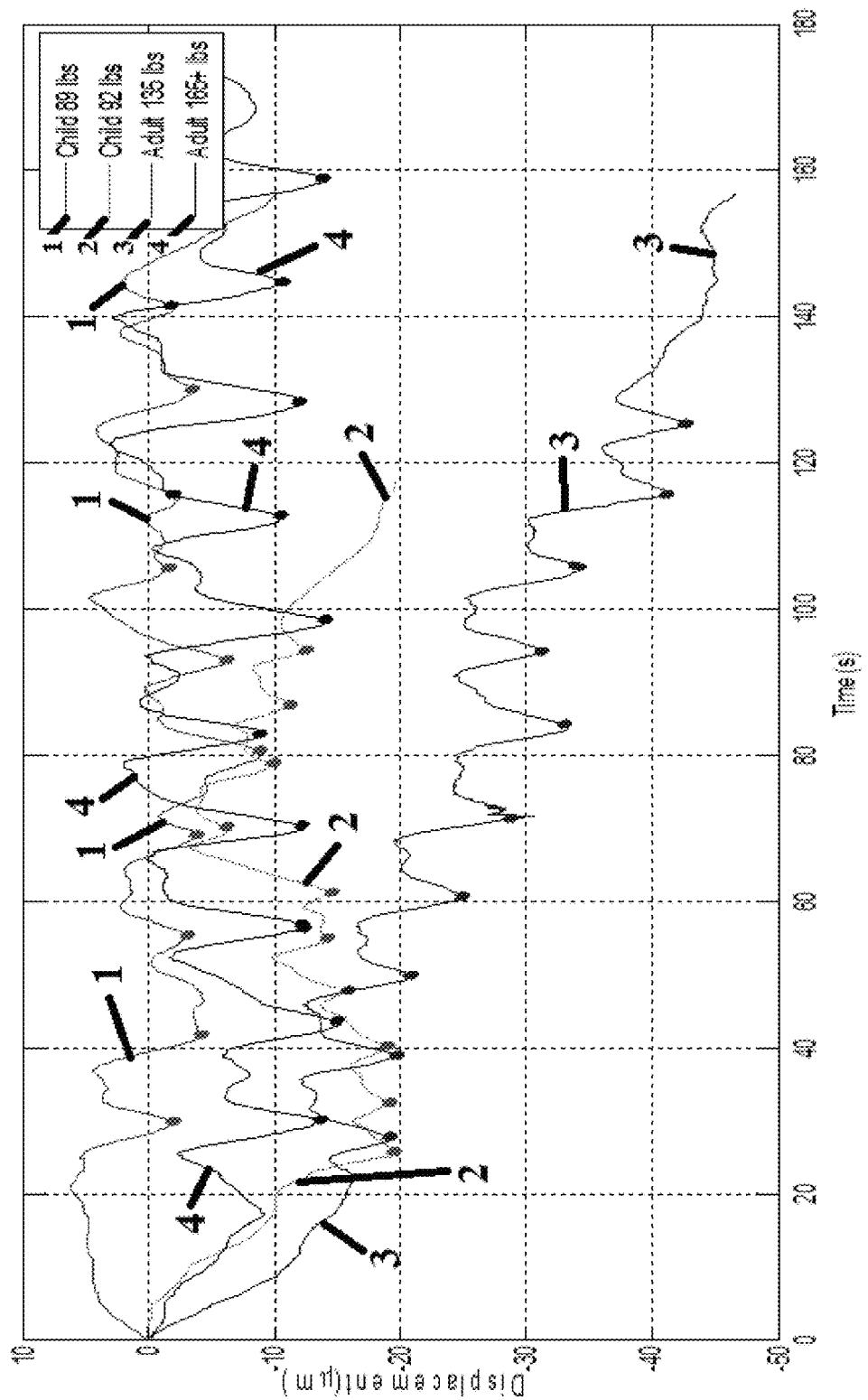
FIGS. 12A-12C show data acquired via a thrust stand in accordance with an embodiment of the invention that was used to detect mechanical displacement and/or mechanical vibration.
Figure 12B:
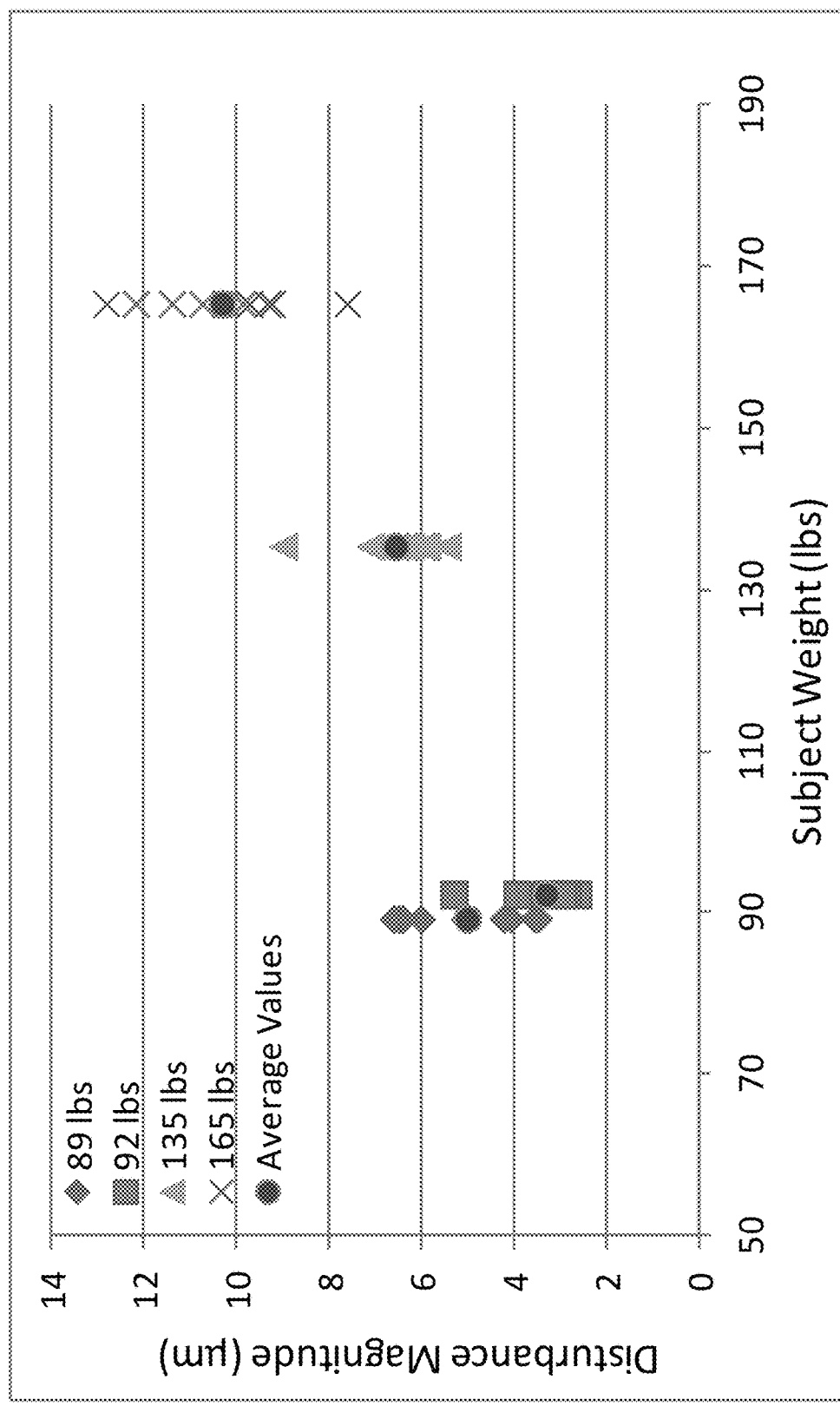
Figure 12C:
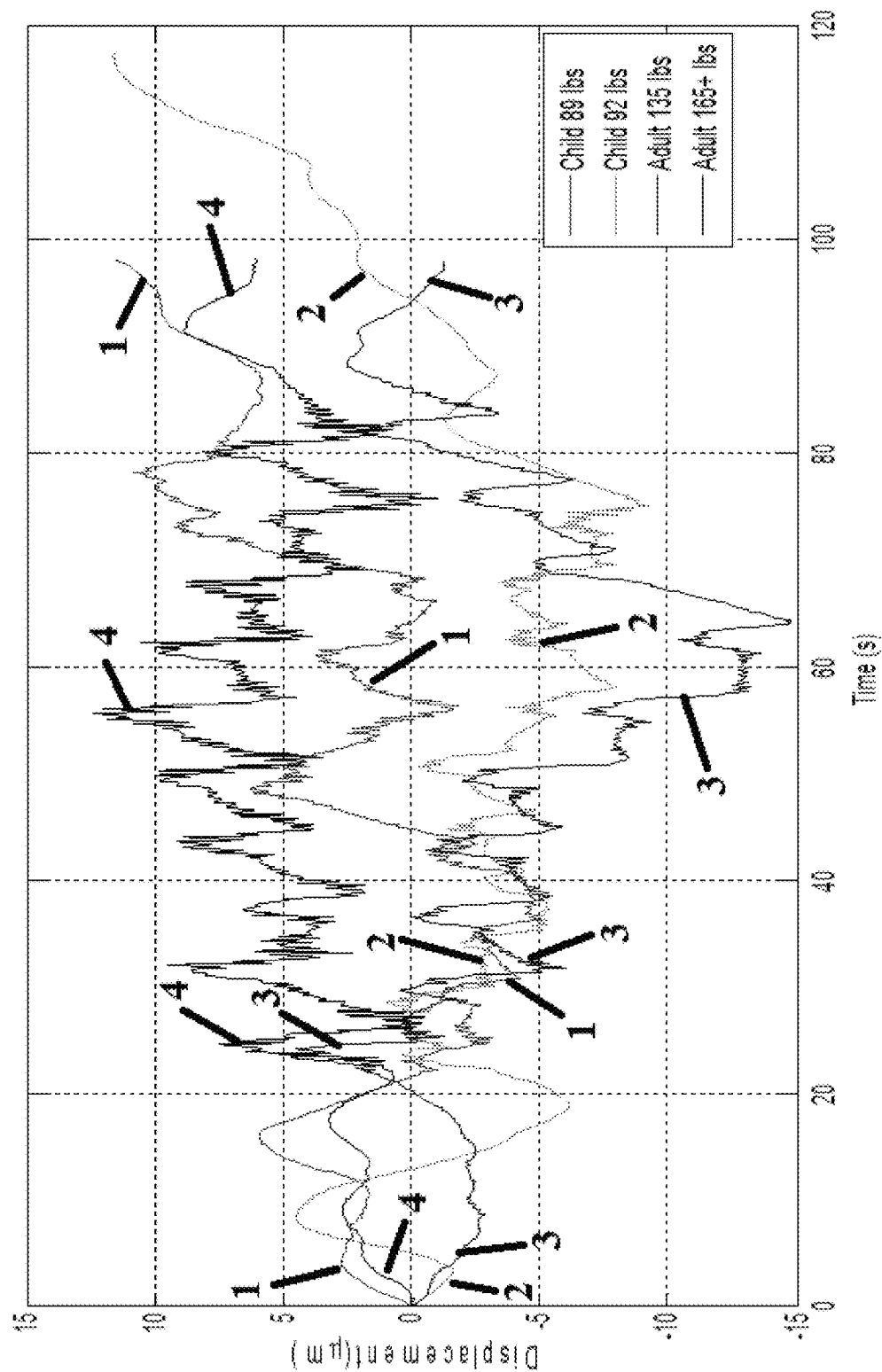

Embodiments of the thrust stand can also be used as a mechanical vibration detector, such that a signature and/or magnitude of a detected mechanical vibration applied to the frame or other portion of the thrust stand can be identified, as the vibration causes the output of the LDS to show the vibration. FIGS. 12A-12C show data acquired via a thrust stand in accordance with an embodiment of the invention that as used to detect mechanical displacement and/or mechanical vibration detector, where FIGS. 12A and 12B show the results of detecting 10 footsteps of 4 subjects of varying weight while walking, and FIG. 12C shows the results of detecting footsteps of the 4 subjects while running. The data was collected by placing an apparatus as shown in FIG. 1 within a cylindrical isolation chamber that isolated the apparatus from at least a portion of the vibrations that might otherwise couple to the apparatus and placing the cylindrical chamber in contact with the ground, with the axis of rotation of the cross beam being vertical, while the subjects walked or ran past. The vibrations from the subjects walking or running then coupled to the apparatus. Embodiments of the invention can orient the apparatus such that the axis of rotation is in different directions and can detect vibrations from other directions or origins. The interconnection between the apparatus and the source of vibrations can be altered to enhance detection.

Figure 11A:
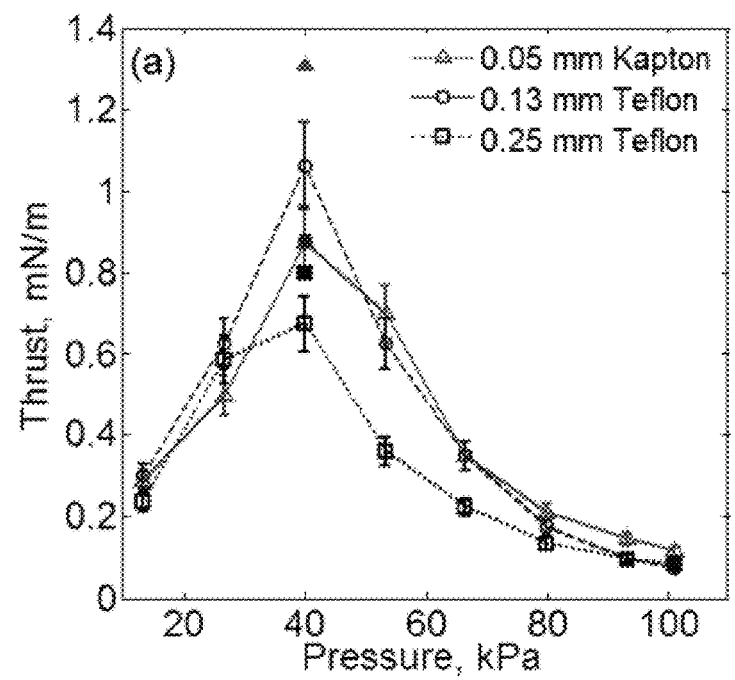
FIGS. 11A-11B show low pressure trends for dielectric barrier discharge (DBD) actuators obtained using an embodiment of a thrust stand in accordance with an embodiment of the subject invention where
Figure 11B:
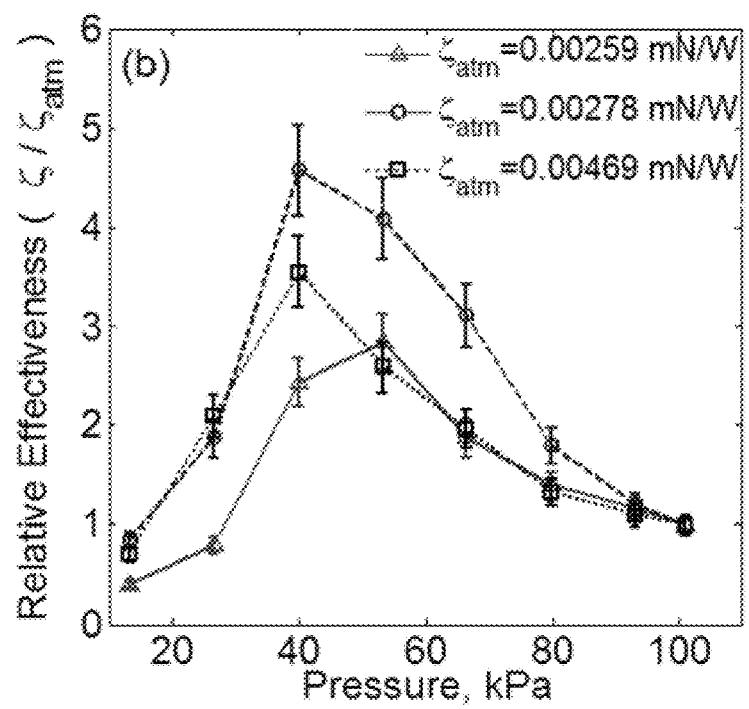

Soni and Roy [17] have used an embodiment of the subject thrust stand to study low pressure performance of conventional (macroscale) DBD actuators. An embodiment of the subject thrust stand was able to function reliably vis-à-vis displacement measurements and damping when tested at pressures down to 20 Torr. The force trends were found to be in agreement with those based on low pressure force measurement from a commercial precision balance (Ohaus Adventurer Pro™ AV313C, resolution 1 mg), further confirming reliability under a wide range of operating conditions. FIGS. 11A-11B present these results.

Aspects of the invention may be described in the general context of computer-executable instructions, such as program modules, being executed by a computer. Generally, program modules include routines, programs, objects, components, data structures, etc., that perform particular tasks or implement particular abstract data types. Moreover, those skilled in the art will appreciate that the invention may be practiced with a variety of computer-system configurations, including multiprocessor systems, microprocessor-based or programmable-consumer electronics, minicomputers, mainframe computers, and the like. Any number of computer-systems and computer networks are acceptable for use with the present invention.

Specific hardware devices, programming languages, components, processes, protocols, and numerous details including operating environments and the like are set forth to provide a thorough understanding of the present invention. In other instances, structures, devices, and processes are shown in block-diagram form, rather than in detail, to avoid obscuring the present invention. But an ordinary-skilled artisan would understand that the present invention may be practiced without these specific details. Computer systems, servers, work stations, and other machines may be connected to one another across a communication medium including, for example, a network or networks.

As one skilled in the art will appreciate, embodiments of the present invention may be embodied as, among other things: a method, system, or computer-program product. Accordingly, the embodiments may take the form of a hardware embodiment, a software embodiment, or an embodiment combining software and hardware. In an embodiment, the present invention takes the form of a computer-program product that includes computer-useable instructions embodied on one or more computer-readable media.

Computer-readable media include both volatile and non-volatile media, transient and non-transient media, removable and nonremovable media, and contemplate media readable by a database, a switch, and various other network devices. By way of example, and not limitation, computer-readable media comprise media implemented in any method or technology for storing information. Examples of stored information include computer-useable instructions, data structures, program modules, and other data representations. Media examples include, but are not limited to, information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

The invention may be practiced in distributed-computing environments where tasks are performed by remote-processing devices that are linked through a communications network. In a distributed-computing environment, program modules may be located in both local and remote computer-storage media including memory storage devices. The computer-useable instructions form an interface to allow a computer to react according to a source of input. The instructions cooperate with other code segments to initiate a variety of tasks in response to data received in conjunction with the source of the received data.

The present invention may be practiced in a network environment such as a communications network. Such networks are widely used to connect various types of network elements, such as routers, servers, gateways, and so forth. Further, the invention may be practiced in a multi-network environment having various, connected public and/or private networks.

Communication between network elements may be wireless or wireline (wired). As will be appreciated by those skilled in the art, communication networks may take several different forms and may use several different communication protocols. And the present invention is not limited by the forms and communication protocols described herein.

All patents, patent applications, provisional applications, and publications referred to or cited herein are incorporated by reference in their entirety, including all figures and tables, to the extent they are not inconsistent with the explicit teachings of this specification.

It should be understood that the examples and embodiments described herein are for illustrative purposes only and that various modifications or changes in light thereof will be suggested to persons skilled in the art and are to be included within the spirit and purview of this application and the scope of the appended claims. In addition, any elements or limitations of any invention or embodiment thereof disclosed herein can be combined with any and/or all other elements or limitations (individually or in any combination) or any other invention or embodiment thereof disclosed herein, and all such combinations are contemplated with the scope of the invention without limitation thereto.

REFERENCES

[1] J. Muller, "Thruster Options for Microspacecraft: A Review and Evaluation of State-of-the-Art and Emerging Technologies," AIAA J., vol. 187, 2000.
[2] C. Coulomb, Histoire de l'Académie Royale des Sciences, 1785, pp. 569-577.
[3] H. Cavendish, "Experiments to Determine the Density of the Earth," Philosophical Transactions of the Royal Soceity of London (Part II), vol. 88, pp. 469-526, 1798.
[4] Jamison, A. Ketsdever and E. Muntz, "Accurate Measurement of Nano-Newton Thrust for Micropropulsion System Characterization," 27th International Electric Propulsion Conference, IEPC-01-236, Pasadena, Calif., 2001.
[5] J. Ziemer, "Performance Measurements Using a Sub-Micronewton Resolution Thrust Stand," 27th International Electric Propulsion Conference, IEPC-01-238, Pasadena, Calif., 2001.
[6] M. Gamero-Castano, V. Hruby and M. Martinez-Sanchez, "A Torsional Balance that Resolves Sub-micro-Newton Forces," 27th International Electric Propulsion Conference, IEPC-01-235, Pasadena, Calif., 2001.
[7] M. Gamero-Castaño, "A torsional balance for the characterization of microNewton thrusters," Review of Scientific Instruments, vol. 74, no. 10, 2003.
[8] Yuan-Xia Yang, Liang-Cheng Tu, Shan-Qing Yang, and Jun Luo, "A torsion balance for impulse and thrust measurements of micro-Newton thrusters", Review of Scientific Instruments, 83, 015105, 2012.
[9] S. Roy, "Method and Apparatus for Small Satellite Propulsion". UF Patent Application Patent 61/304,915, WO/2011/103194A2, 25 Aug. 2011.
[10] K. Polzin, T. Markusic, B. Stanojev, A. DeHoyos, and B. Spaun, "Thrust stand for electric propulsion performance evaluation", Review of Scientific Instruments, 77, 105108, 2006.
[11] www.kjmagnetics.com
[12] J. Soni and S. Roy, "Design of a microNewton Thrust Stand for Low Pressure Characterization of DBD Actuators," in 51st AIAA Aerospace Sciences Meeting, AIAA-2013-0755, Grapevine, Tex., 2013.
[13] R. Durscher and S. Roy, "Evaluation of thrust measurement techniques for dielectric barrier discharge actuators Ryan Durscher," Experiments in Fluids, vol. 53, No. 4, 2012.
[14] J. Clifton and T. Heaton, Potential Advantages of a Strong-motion Velocity Meter over a Strong-motion Accelerometer", Seismological Research Letters, Volume 73, Number 3, May/June 2002
[15] J. Bendat and A. Piersol, Random Data Analysis and Measurement Procedures, Fourth ed., Wiley, 2010, p. 331.
[16] J. Zito, R. Durscher, J. Soni, S. Roy and D. Arnold, "Flow and force inducement using micron size dielectric barrier discharge actuators," Applied Physics Letters, vol. 100, 193502, 2012.
[17] J. Soni and S. Roy, "Low Pressure Characterization of DBD Actuators," Applied Physics Letters, vol. 102, 112908, 2013.

The invention claimed is:
1. An apparatus, comprising:
a frame;
a cross beam;
two flexure pivots,
wherein the cross beam is interconnected to the frame via the two flexure pivots, and
wherein when the cross beam is rotated about an axis of rotation from a steady state angular rotation position, the two flexure pivots apply a corresponding two restoring forces that tend to rotate the cross beam back to the steady state angular rotation position;
an angular rotation deflection detector,
wherein when the cross beam is rotated about the axis of rotation from the steady state angular rotation position, the angular rotation deflection detector detects an angular rotation deflection of the cross beam about the axis of rotation; and
a magnetic damper,
wherein as the cross beam oscillates about the axis of rotation, eddy currents are induced in the magnetic damper that produce induced magnetic fields that dampen oscillations of the cross beam about the axis of rotation.
2. The apparatus according to claim 1,
wherein the magnetic damper comprises:
a block comprising a conductive material; and
a magnet,
wherein the magnet produces a magnetic field,
wherein the magnet is positioned such that when the cross beam oscillates about the axis of rotation:
(i) the magnetic field of the magnet induces the eddy currents in the block, and
(ii) the eddy currents in the block produce the induced magnetic fields that dampen oscillations of the cross beam about the axis of rotation.
3. The apparatus according to claim 2, wherein the block is a copper block.
4. The apparatus according to claim 2, wherein the block is a cylindrical block.
5. The apparatus according to claim 4, wherein the magnet is a cylindrical magnet.
6. The apparatus according to claim 5, wherein when the cross beam is in the steady state angular rotation position, a longitudinal axis of the block aligns with a longitudinal axis of the magnet.
7. The apparatus according to claim 1, wherein at least one flexure pivot of the two flexure pivots incorporates a corresponding at least one cylindrical spring.
8. The apparatus according to claim 7, wherein a first cylindrical spring of the at least one cylindrical spring has a spring constant less than 0.0016 N-m/deg.
9. The apparatus according to claim 8, wherein the spring constant is in the range 0.0002 to 0.0014 N-m/deg.
10. The apparatus according to claim 1, wherein the angular rotation deflection detector comprises a displacement detector, wherein the displacement detector determines a displacement of a location on the cross beam at a distance, d, from the axis of rotation of the cross beam, and
wherein the displacement allows determination of the angular rotation deflection of the cross beam about the axis of rotation.

11. The apparatus according to claim 10, wherein the displacement detector comprises an optical linear displacement sensor.

12. The apparatus according to claim 1, further comprising:
an isolation chamber,
wherein the frame and the cross beam are positioned within the isolation chamber, and
wherein the isolation chamber reduces mechanical vibration noise.

13. The apparatus according to claim 12, wherein a pressure within the isolation chamber is less than atmospheric pressure.

14. The apparatus according to claim 13, wherein the pressure within the isolation chamber is less than $10^{-4}$ torr.

15. The apparatus according to claim 14, wherein the pressure within the isolation chamber is less than $10^{-6}$ torr.

16. The apparatus according to claim 1, further comprising:
a first electrode positioned on the cross beam; and
a second electrode positioned such that application of a voltage across the first electrode and second electrode creates an electrostatic force to rotate the cross beam about the axis of rotation.

17. The apparatus according to claim 16, wherein the second electrode is positioned on the frame.

18. The apparatus according to claim 1, wherein the cross beam extends further from the axis of rotation in a first direction than in a second direction,
wherein the first direction is perpendicular to the axis of rotation, and
wherein the second direction is an opposite direction to the first direction.

19. The apparatus according to claim 18, further comprising:
a counter weight attached to the cross beam such that the counter weight balances the cross beam about a second axis,
wherein the second axis is perpendicular to the axis of rotation.

20. The apparatus according to claim 19, wherein the counter weight comprises a conductor.

21. A method of calibrating an apparatus, comprising:
providing an apparatus;
wherein the apparatus comprises:
a frame;
a cross beam;
two flexure pivots,
wherein the cross beam is interconnected to the frame via the two flexure pivots, and
wherein when the cross beam is rotated about an axis of rotation from a steady state angular rotation position, the two flexure pivots apply a corresponding two restoring forces that tend to rotate the cross beam back to the steady state angular rotation position; and
an angular rotation deflection detector,
wherein when the cross beam is rotated about the axis of rotation from the steady state angular rotation position, the angular rotation deflection detector detects an angular rotation deflection of the cross beam about the axis of rotation;

measuring n cycles of damped oscillations of the cross beam about the axis of rotation, where n is an integer, and where n>1;
determining a first amplitude, $x_0$, of a first peak and an $n^{th}$ amplitude, $x_n$, of an $n^{th}$ peak of the n cycles of damped oscillations of the cross beam about the axis of rotation; and
determining a logarithmic decrement δ, where $$\delta = \frac{1}{n}\ln\frac{x_0}{x_n};$$

determining a damping ratio ζ, where $$\varsigma = \frac{1}{\sqrt{1+\left(\frac{2\pi}{\delta}\right)^2}};$$

determining a damped frequency of the n cycles of damped oscillations of the cross beam about the axis of rotation, $\omega_d$;
estimating a natural frequency, $\omega_n$, where $$\omega_n = \frac{\omega_d}{\sqrt{1-\varsigma^2}};$$

and
determining a spring constant, $k_\theta$, where $k_\theta = \omega_n^2 \cdot I_\theta$, and where $I_\theta$ is a moment of inertia of the cross beam about the axis of rotation.

22. The method according to claim 21, wherein the apparatus further comprises:
a magnetic damper,
wherein as the cross beam oscillates about the axis of rotation, eddy currents are induced in the magnetic damper that produce induced magnetic fields that dampen oscillations of the cross beam about the axis of rotation.

23. The method according to claim 22, wherein the magnetic damper comprises:
a block comprising a conductive material; and
a magnet, wherein the magnet produces a magnetic field, and
wherein the magnet is positioned such that when the cross beam oscillates about the axis of rotation:
(i) the magnetic field of the magnet induces the eddy currents in the block, and
(ii) the eddy currents in the block produce the induced magnetic fields that dampen oscillations of the cross beam about the axis of rotation.

24. The method according to claim 23, wherein the block is a copper block.

25. The method according to claim 23, wherein the block is a cylindrical block.

26. The method according to claim 25, wherein the magnet is a cylindrical magnet.

27. The method according to claim 26, wherein when the cross beam is in the steady state angular rotation position, a longitudinal axis of the block aligns with a longitudinal axis of the magnet.

28. The method according to claim 23, wherein the apparatus further comprises:

a first electrode positioned on the cross beam; and
a second electrode positioned such that application of a voltage across the first electrode and second electrode creates an electrostatic force to rotate the cross beam about the axis of rotation,
wherein the method further comprises:
applying a calibration voltage across the first electrode and the second electrode for a period of time to rotate the cross beam about the axis of rotation to a calibration angular rotation position,
wherein applying the calibration voltage initiates the n cycles of damped oscillations of the cross beam about the axis of rotation.

29. The method according to claim 28, wherein the second electrode is positioned on the frame.

30. A method of measuring thrust exerted by a device, comprising:
providing an apparatus,
wherein the apparatus comprises:
a frame;
a cross beam;
two flexure pivots,
wherein the cross beam is interconnected to the frame via the two flexure pivots, and
wherein when the cross beam is rotated about an axis of rotation from a steady state angular rotation position, the two flexure pivots apply a corresponding two restoring forces that tend to rotate the cross beam back to the steady state angular rotation position;
an angular rotation deflection detector,
wherein when the cross beam is rotated about the axis of rotation from the steady state angular rotation position, the angular rotation deflection detector detects an angular rotation deflection of the cross beam about the axis of rotation; and
a magnetic damper,
wherein as the cross beam oscillates about the axis of rotation, eddy currents are induced in the magnetic damper that produce induced magnetic fields that dampen oscillations of the cross beam, and
wherein the method comprises:
mounting a device on the cross beam;
activating the device to exert a thrust;
measuring an angular rotation deflection of the cross beam about the axis of rotation caused by the thrust; and
determining the thrust from the angular rotation deflection of the cross beam about the axis of rotation caused by the thrust.

31. The method according to claim 30, wherein the device is a dielectric barrier discharge actuator.

32. The method according to claim 30, wherein a pressure surrounding the device is less than atmospheric pressure.

33. The method according to claim 32, wherein the pressure surrounding the device is less than $10^{-4}$ torr.

34. The method according to claim 32, wherein the pressure surrounding the device is less than $10^{-6}$ torr.

35. The apparatus according to claim 1, further comprising:
a non-transitory computer readable medium containing a set of instructions that when executed cause a computer to perform a method,
wherein the method comprises:
measuring n cycles of damped oscillations of the cross beam about the axis of rotation, where n is an integer, and where n>1;
determining a first amplitude, $x_0$, of a first peak and an $n^{th}$ amplitude, $x_n$, of an $n^{th}$ peak of the n cycles of damped oscillations of the cross beam about the axis of rotation;
determining a logarithmic decrement $\delta$, where $$\delta = \frac{1}{n}\ln\frac{x_0}{x_n};$$

determining a damping ratio $\zeta$, where $$\zeta = \frac{1}{\sqrt{1+\left(\frac{2\pi}{\delta}\right)^2}};$$

determining a damped frequency of the n cycles of damped oscillations of the cross beam about the axis of rotation, $\omega_d$;
estimating a natural frequency, $\omega_n$, where $$\omega_n = \frac{\omega_d}{\sqrt{1-\zeta^2}};$$

and
determining a spring constant, $k_\theta$, where $k_\theta = \omega_n^2 \cdot I_\theta$, and where $I_\theta$ is a moment of inertia of the cross beam about the axis of rotation.

36. A mechanical vibration detector, comprising:
an apparatus according to claim 1 wherein mechanical vibrations coupled to the apparatus are detected from the angular rotation deflection of the cross beam about the axis of rotation caused by the mechanical vibration coupled to the apparatus.

37. A method of detecting a mechanical vibration, comprising:
providing an apparatus,
wherein the apparatus comprises:
a frame;
a cross beam;
two flexure pivots,
wherein the cross beam is interconnected to the frame via the two flexure pivots, and
wherein when the cross beam is rotated about an axis of rotation from a steady state angular rotation position, the two flexure pivots apply a corresponding two restoring forces that tend to rotate the cross beam back to the steady state angular rotation position;
an angular rotation deflection detector,
wherein when the cross beam is rotated about the axis of rotation from the steady state angular rotation position, the angular rotation deflection detector detects an angular rotation deflection of the cross beam about the axis of rotation; and
a magnetic damper,
wherein as the cross beam oscillates about the axis of rotation, eddy currents are induced in the magnetic damper that produce induced magnetic fields that dampen oscillations of the cross beam about the axis of rotation, and
wherein the method comprises:
coupling a mechanical vibration to the apparatus;

measuring an angular rotation deflection of the cross beam about the axis of rotation caused by the thrust; and detecting the mechanical vibration from the angular rotation deflection of the cross beam about the axis of rotation caused by the mechanical vibration coupled to the apparatus.

* * * * *